US008842036B2

(12) United States Patent
Pritt et al.

(10) Patent No.: US 8,842,036 B2
(45) Date of Patent: Sep. 23, 2014

(54) AUTOMATED REGISTRATION OF SYNTHETIC APERTURE RADAR IMAGERY WITH HIGH RESOLUTION DIGITAL ELEVATION MODELS

(75) Inventors: Mark Pritt, Walkersville, MD (US); Michael Alan Gribbons, Litchfield Park, AZ (US)

(73) Assignee: Lockheed Martin Corporation, Bethesda, MD (US)

( * ) Notice: Subject to any disclaimer, the term of this patent is extended or adjusted under 35 U.S.C. 154(b) by 788 days.

(21) Appl. No.: 13/095,376

(22) Filed: Apr. 27, 2011

(65) Prior Publication Data

US 2012/0274505 A1     Nov. 1, 2012

(51) Int. Cl.
*G01S 13/90* (2006.01)
*G01S 17/89* (2006.01)
*G01S 17/02* (2006.01)

(52) U.S. Cl.
CPC .............. *G01S 17/023* (2013.01); *G01S 17/89* (2013.01); *G01S 13/9035* (2013.01)
USPC ............ 342/25 A; 342/25 F; 342/52; 342/54; 342/179; 342/189

(58) Field of Classification Search
CPC ..................... G06T 17/05; G06T 2207/10032; G06T 2207/30181; G06T 7/0026; G06T 7/0024; G06T 3/4038; G06T 5/006; G06K 9/0063; G06K 9/32; G01C 11/06; G01S 13/867; G01S 13/90; G01S 17/023; G01S 17/89; G01S 13/9035

USPC ......... 342/25 R, 25 A, 25 F, 52–55, 179, 189, 342/191, 195
See application file for complete search history.

(56) References Cited

U.S. PATENT DOCUMENTS

| 5,353,030 | A | 10/1994 | Koch et al. |
| 5,608,405 | A * | 3/1997 | Pritt ............................ 342/25 C |
| 5,680,138 | A | 10/1997 | Pritt |
| 5,926,581 | A | 7/1999 | Pritt |
| 6,150,972 | A | 11/2000 | Bickel et al. |
| 6,622,118 | B1 | 9/2003 | Crooks et al. |
| 7,194,389 | B2 | 3/2007 | Damron |
| 8,229,163 | B2 * | 7/2012 | Coleman et al. ............. 382/103 |
| 8,306,274 | B2 * | 11/2012 | Grycewicz .................... 382/106 |
| 8,493,264 | B2 * | 7/2013 | Sasakawa ..................... 342/179 |
| 8,768,104 | B2 * | 7/2014 | Moses et al. .................. 382/305 |
| 2002/0060784 | A1 * | 5/2002 | Pack et al. ......................... 356/6 |
| 2004/0041999 | A1 * | 3/2004 | Hogan et al. ................ 356/141.5 |
| 2005/0031197 | A1 * | 2/2005 | Knopp .......................... 382/154 |
| 2005/0220363 | A1 * | 10/2005 | Oldroyd ........................ 382/294 |
| 2006/0197837 | A1 * | 9/2006 | Flath et al. .................... 348/143 |
| 2006/0215935 | A1 * | 9/2006 | Oldroyd ........................ 382/294 |

(Continued)

FOREIGN PATENT DOCUMENTS

| CN | 101078769 A | 11/2007 |
| JP | 2007248216 A | 9/2007 |

*Primary Examiner* — John B Sotomayor
(74) *Attorney, Agent, or Firm* — Ronald E. Prass, Jr.; Prass LLP (57) ABSTRACT

A method, a radar image registration manager, and a set of instructions are disclosed. A primary sensor interface 430 may receive a primary sensor image and a camera model of the primary sensor image. A data storage 420 may store a digital elevation model. A processor 410 may automatically align the primary sensor image with the digital elevation model.

20 Claims, 9 Drawing Sheets

(56) References Cited

U.S. PATENT DOCUMENTS

| | | | |
|---|---|---|---|
| 2007/0162193 A1* | 7/2007 | Garceau et al. | 701/3 |
| 2008/0074494 A1* | 3/2008 | Nemethy et al. | 348/143 |
| 2008/0240616 A1* | 10/2008 | Haering et al. | 382/294 |
| 2008/0270031 A1* | 10/2008 | Miller et al. | 702/5 |
| 2009/0074254 A1* | 3/2009 | Jamison et al. | 382/113 |
| 2009/0105954 A1* | 4/2009 | Van Workum et al. | 702/5 |
| 2009/0106000 A1* | 4/2009 | Kelley et al. | 703/6 |
| 2009/0210205 A1* | 8/2009 | Sullivan et al. | 703/6 |
| 2010/0045513 A1* | 2/2010 | Pett et al. | 342/25 C |
| 2010/0118053 A1* | 5/2010 | Karp et al. | 345/630 |
| 2010/0232728 A1* | 9/2010 | Leprince et al. | 382/294 |
| 2010/0241406 A1* | 9/2010 | Rahmes et al. | 703/1 |
| 2010/0303340 A1* | 12/2010 | Abraham et al. | 382/154 |
| 2010/0328499 A1* | 12/2010 | Sun | 348/239 |
| 2011/0007948 A1* | 1/2011 | Oldroyd | 382/106 |
| 2011/0043402 A1* | 2/2011 | Sasakawa | 342/25 A |
| 2011/0110580 A1* | 5/2011 | Akbari et al. | 382/154 |
| 2011/0144962 A1* | 6/2011 | Blask et al. | 703/6 |
| 2011/0163911 A1* | 7/2011 | Costantini et al. | 342/25 C |
| 2012/0027371 A1* | 2/2012 | Hackett et al. | 386/223 |
| 2012/0038902 A1* | 2/2012 | Dotson | 356/4.01 |
| 2012/0114229 A1* | 5/2012 | Zhou | 382/164 |
| 2012/0179433 A1* | 7/2012 | Wivell et al. | 703/2 |
| 2012/0226470 A1* | 9/2012 | Seymour | 702/150 |
| 2012/0274505 A1* | 11/2012 | Pritt et al. | 342/25 A |
| 2013/0060540 A1* | 3/2013 | Frahm et al. | 703/2 |

* cited by examiner

AUTOMATED REGISTRATION OF SYNTHETIC APERTURE RADAR IMAGERY WITH HIGH RESOLUTION DIGITAL ELEVATION MODELS

BACKGROUND

1. Field of the Invention

The present invention relates to a method and system for automatically registering images. The present invention further relates to automatically registering a registrant sensor image with a digital elevation model.

2. Introduction

Current sensor technology provides multiple options for imaging a landscape. Synthetic aperture radar may use radio detecting and ranging to create an image. A LIDAR may use light detecting and ranging to create a digital elevation model. An electrical optical sensor may create an electrical optical image. Each type of image may provide a different data set that provides a different set of advantages and disadvantages.

SUMMARY OF THE INVENTION

A method, a radar image registration manager, and a set of instructions are disclosed. A primary sensor interface may receive a primary sensor image and a camera model of the primary sensor image. A data storage may store a digital elevation model. A processor may automatically align the primary sensor image with the digital elevation model.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an electronic device, and a set of instructions, and other embodiments that relate to the basic concepts of the invention. The electronic device may be any manner of computer, mobile device, wireless communication device, or general purpose electronic device. The set of instructions may reside in a storage medium. The set of instructions may be executable by a processor to implement a method for managing application components.

A method, a radar image registration manager, and a set of instructions are disclosed. A primary sensor interface may receive a primary sensor image and a camera model of the primary sensor image. A data storage may store a digital elevation model. A processor may automatically align the primary sensor image with the digital elevation model.

Registration is the assignment of the pixels of an image to a set of data coordinates, such as a second image or a set of spatial coordinates. Registration may assist in the process of combining multiple types of image data. Specifically, registration may allow image data from multiple sensors to be combined to provide a more holistic view to a user. Registration may also be used in the process of orthorectification. Orthorectification is the spatial transformation of an image to an overhead view. Registration and orthorectification may be used to correct such issues as layover and radar shadow, while also providing a clearer picture of the area that a set of sensors are scanning. Georegistration, or geopositioning, is the assignment of three-dimensional spatial coordinates to the pixels of an image. Registration may be used to correct a number of sensor phenomena that may provide misleading information.

Figure 1A:
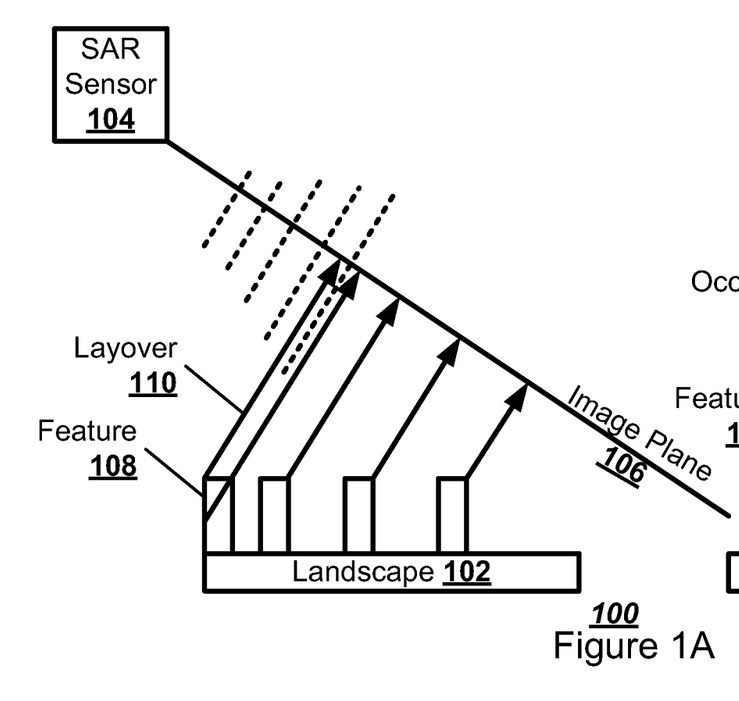
FIGS. 1a-b illustrate, in a block diagram, one embodiment of sensor interaction.

FIG. 1a illustrates, in a block diagram, one embodiment of a layover sensor interaction 100. A landscape 102 in an urban or rural environment may have varied levels of elevation. A synthetic aperture radar (SAR) sensor 104 may scan the landscape 102 along an image plane 106. As the image plane 106 crosses the landscape 102, a landscape feature 108 with an extreme elevation change, such as a building 108, may create layover phenomenon 110. Layover phenomenon 110 occurs when a radar signal bounces off the top of the landscape feature and returns to the SAR sensor 104 before a contemporary radar signal bounces off the bottom of the landscape feature and returns to the SAR sensor 104.

Figure 1B:
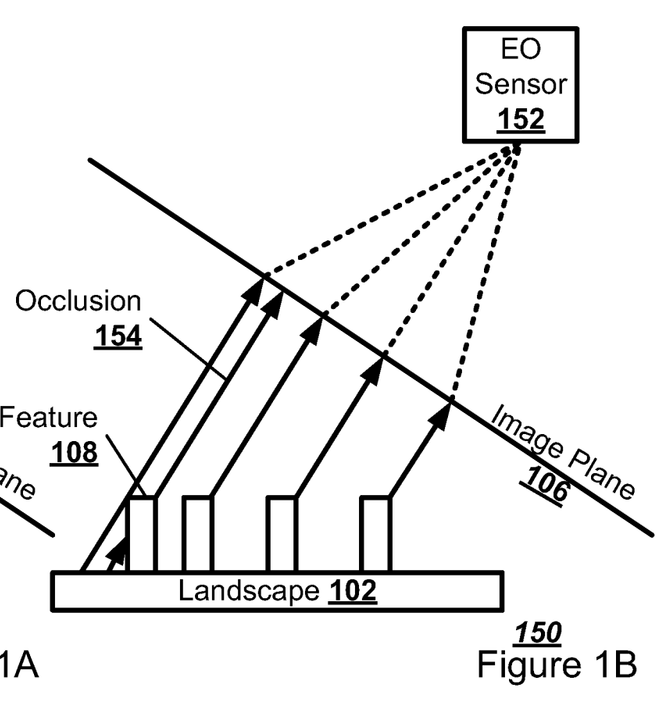

FIG. 1b illustrates, in a block diagram, one embodiment of an occlusion sensor interaction 150. An electrical optical (EO) sensor 152 may scan the landscape 102 from a point normal to the image plane 106. From the image plane 106, portions of the landscape 102 may be blocked by an occlusion phenomenon 154. An occlusion phenomenon 154 occurs when a radar signal is blocked by a landscape feature from reaching a different landscape feature. The layover phenomenon 108 and the occlusion phenomenon 154 may be modeled using ray tracing. Reflectance from the image plane 106 may be modeled with a Lambertian cosine model. A Lambertian cosine model assumes that the radiant intensity observed from the image plane 106 may be directly proportional to the cosine of the angle between the EO sensor 152 and a vector normal to the image plane 106.

Figures 2A, 2B:
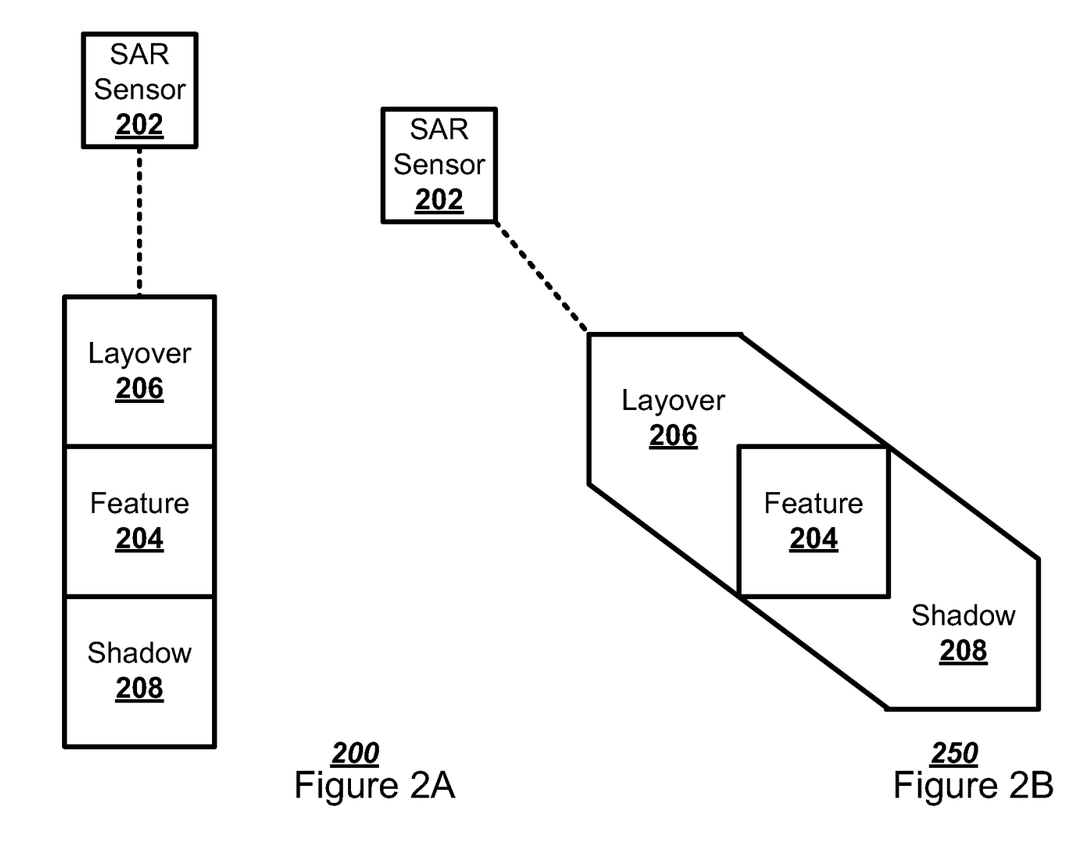
FIGS. 2a-b illustrate, in a block diagram, one embodiment of the effect of sensor movement across a landscape feature.

FIG. 2a further illustrates, in a block diagram, one embodiment of sensor reading at a normal angle 200. A SAR sensor 202 may send a radar signal at an angle normal to the face of a landscape feature 204. A layover phenomenon 206 may occur in front of the face of the landscape feature 204 directly between the SAR sensor 202 and the landscape feature 204. A shadow phenomenon 208, or occlusion phenomenon 208, may occur behind the landscape feature 204, in a direct line with the SAR sensor 202 and the landscape feature 204.

FIG. 2b illustrates, in a block diagram, one embodiment of a sensor reading at an oblique angle 250. The SAR sensor 202 may send a radar signal at an oblique angle to the face of the landscape feature 204. The layover phenomenon 206 may occur in the direction of the radar illumination and may be offset by imaging geometry. The shadow phenomenon 208 may occur at an oblique angel to the landscape feature 204, in a direct line with the SAR sensor 202 and the landscape feature 208.

By combining the data present in a sensor image with the geospatial coordinates provided by a digital elevation model (DEM), a user may acquire a clearer representation of an area. The sensor may be a synthetic aperture radar, an EO sensor, or other sensor device. The SAR image 804 may be in a national imagery transmission format (NITF), a tagged image file format (TIFF), a Joint Photographic Experts Group (JPEG) standard format, a portable network graphics (PNG) format, a bitmap (BMP) image file format, or other image file formats.

A DEM, also referred to as a digital terrain model (DTM) or a digital surface model (DSM), is a data set that describes the elevation coordinates for a given area. A light detecting and ranging (LIDAR) sensor may produce a usable DEM. The process of stereo photogrammetry or interferometry may be applied to two or more images, such as two SAR images or two EO images, to create a DEM. The DEM may be in a geographical tagged image file format (GeoTIFF), a digital terrain elevation data (DTED) format, a United State Geological Survey (USGS) DEM format, or a raster format.

A radar image registration manager may automatically align a primary sensor image with a DEM. Once the radar image registration manager has aligned the primary sensor image with the DEM, the radar image registration manager may align a second sensor image, referred to herein as a registrant sensor image, with the DEM. The radar image registration manager may use the common spatial coordinates provided by the DEM to align the primary sensor image with the registrant sensor image.

Figure 3:
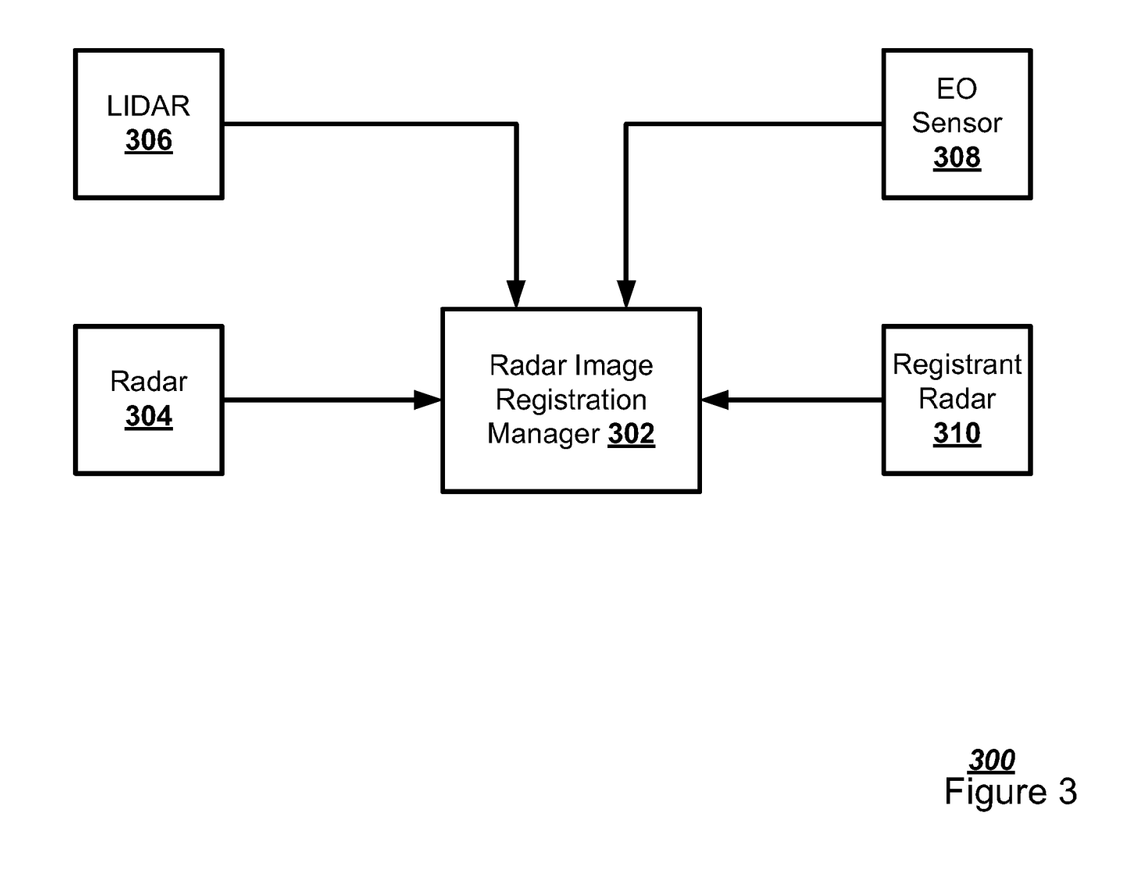
FIG. 3 illustrates, in a block diagram, one embodiment of composite graphing.

FIG. 3 illustrates, in a block diagram, one embodiment of a sensor layout 300. The radar image registration manager 302 may receive the primary sensor image, the DEM, and the registrant sensor image from a range of sensor devices. A SAR sensor 304 may send the radar image registration manager 302 a SAR image that may be used as the primary sensor image. A LIDAR sensor 306 may send the radar image registration manager 302 a DEM. An EO sensor 308 may send the radar image registration manager 302 an EO image that may be used as a registrant sensor image. A registrant SAR sensor 310 may send the radar image registration manager 302 a registrant SAR image that may be used as a registrant sensor image.

Figure 4:
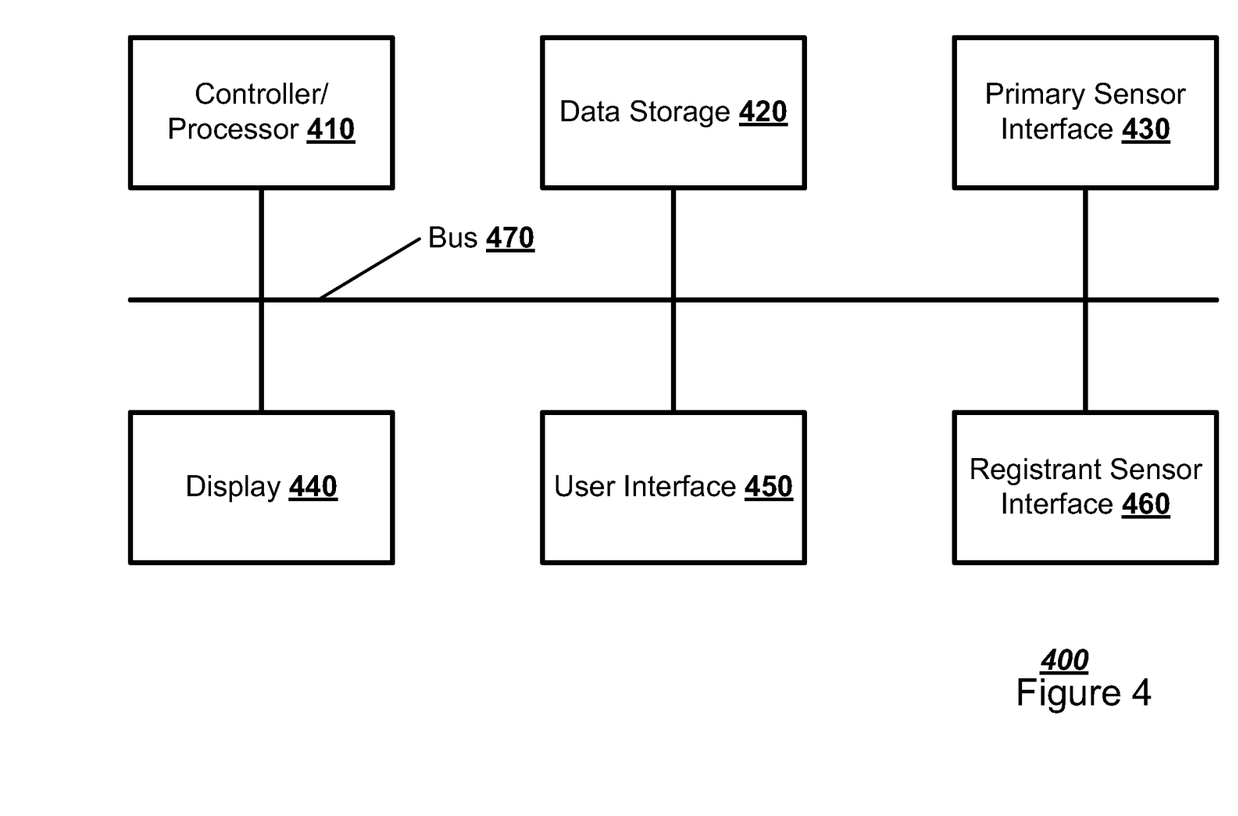
FIG. 4 illustrates, in a block diagram, one embodiment of a sensor layout.

FIG. 4 illustrates, in a block diagram, one embodiment of a computer 400 to operate a radar image registration manager 302. The computing system 400 may include a controller/processor 410, a memory 420, a primary sensor interface 430, a display 440, a user interface 450, and a registrant sensor interface 460, connected through bus 470. The network server 400 may implement any operating system. Client and server software may be written in any programming language, such as C, C++, Java or Visual Basic. The server software may run on an application framework, such as a Java® server or .NET® framework The controller/processor 410 may be any programmed processor known to one of skill in the art. However, the disclosed method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the disclosed method as described herein may be used to implement the disclosed system functions of this invention.

The data storage 420 may include volatile and nonvolatile data storage, including one or more electrical, magnetic or optical memories such as a random access memory (RAM), cache, hard drive, or other memory device. The data storage 420 may have a cache to speed access to specific data. The data storage 420 may also be connected to a compact disc-read only memory (CD-ROM), digital video disc-read only memory (DVD-ROM), DVD read write input, tape drive, or other removable memory device that allows media content to be directly uploaded into the system. Data may be stored in the data storage or in a separate database. The data storage 420 may store a DEM from a LIDAR 306 or a DEM calculated from two SAR images and two EO images.

The primary sensor interface 430 may connect the computer 400 to a primary sensor, such as a primary SAR sensor. The primary sensor interface 430 may receive a primary sensor image, such as a SAR image.

The display 440 may be a device that presents a visual representation or a graphical user interface (GUI) to the user. The user interface 450 may be connected to one or more input devices that may include a keyboard, mouse, pen-operated touch screen or monitor, voice-recognition device, or any other device that accepts input. The user interface 450 may also be connected to one or more output devices, such as a monitor, printer, disk drive, speakers, or any other device provided to output data. The user interface 450 may receive a data task or connection criteria from a network administrator.

The registrant sensor interface 460 may be connected to a registrant sensor, such as an EO sensor, a registrant radar, or other secondary sensor. The registrant sensor interface 460 may also be used to input a DEM directly from a LIDAR 306. The components of the network server 400 may be connected via an electrical bus 470, for example, or linked wirelessly.

Client software and databases may be accessed by the controller/processor 410 from memory 420, and may include, for example, database applications, word processing applications, as well as components that embody the disclosed functionality of the present invention. The computer 400 may implement any operating system. Client and server software may be written in any programming language. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

The radar image registration manager 302 may take a primary sensor image, a DEM, an image camera model, and the illumination conditions to create a geopositioned image, a corrected image camera model, and the orthorectified image. The primary sensor image is the initial image to be registered. The camera model is a set of metadata that maps three-dimensional geographic coordinates to their corresponding two-dimensional image coordinates. The illumination conditions are the environmental conditions that may affect the imaging. The geopositioned image is a grid that specifies the three-dimensional geographic coordinates of each image pixel. The corrected image camera model has corrections to the camera model parameters. The orthorectified image is a top view image that may be aligned with a map, inserted into an orthomosaic, or draped over the DEM.

Figure 5:
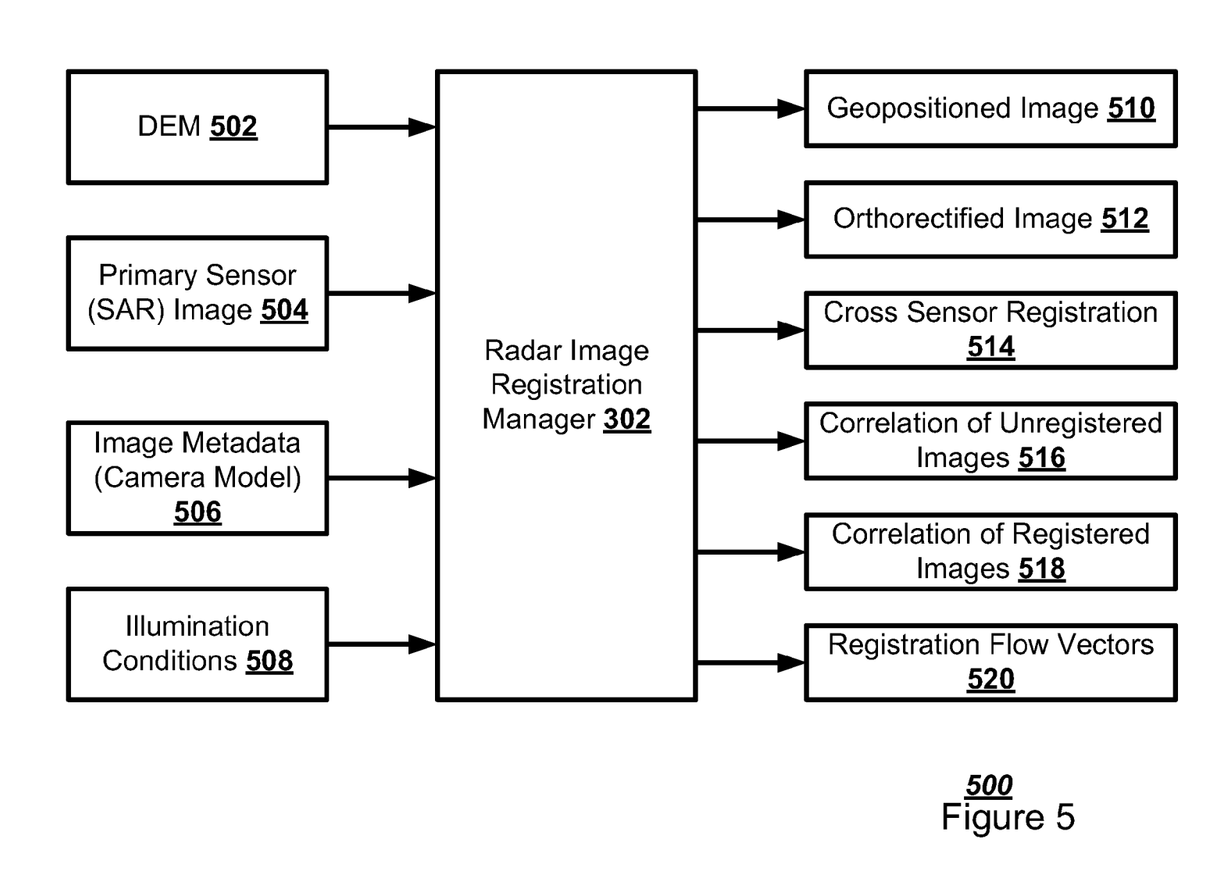
FIG. 5 illustrates, in a block diagram, one embodiment of the input and output layout for a radar image registration manager.

FIG. 5 illustrates, in a block diagram, one embodiment of the input and output layout 500 for a radar image registration manager 302. The radar image registration manager 302 may receive a DEM 502 and a primary sensor image 504, such as a SAR image 504. The radar image registration manager 302 may also receive a set of image metadata 506, such as a camera model 506, for the primary sensor image 504. The radar image registration manager 302 may use the DEM 502, the primary sensor image 504, the image metadata 506, and the illumination conditions 508 to create a set of outputs. The set of outputs may include a geopositioned image 510, an ortho-rectified image 512, a cross sensor registration of the primary sensor and the registrant sensor 514, a correlation of unregistered images 516, a correlation of registered images 518, and a set of registration flow vectors 520.

The radar image registration manager 302 may automatically register the DEM 502 and primary sensor image 504 by creating a simulated image of the DEM 502, identifying tie points between the simulated image and the primary sensor image 504, and determining the registration function. The radar image registration manager 302 creates the simulated image of the registrant sensor image by using the image camera model to project points from the DEM into the image plane, incorporating the illumination conditions and sensor phenomenology. The radar image registration manager 302 may identify the tie points using normalized tie cross correlation. The radar image registration manager 302 may determine the registration function using a least-squares fit to the tie points.

The registration function may depend on the type of imagery. For imagery from satellite sensors, the radar image registration manager 302 may correct the camera model error by a horizontal shift. The radar image registration manager 302 may correct more complicated camera errors using an affine function. The radar image registration manager 302 may correct aerial radar imagery using a quadratic function. The radar image registration manager 302 may correct aerial optical imagery using a homography.

Figure 6:
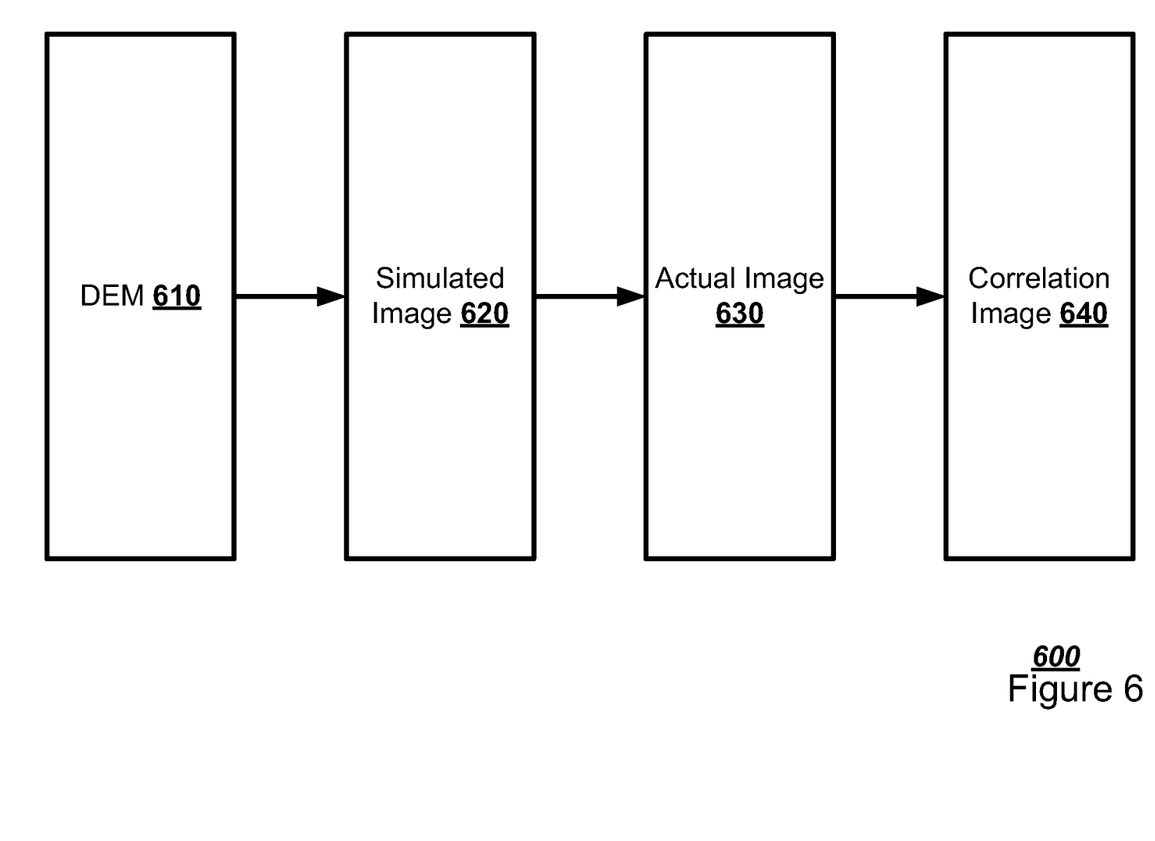
FIG. 6 illustrates, in a block diagram, one embodiment of a computer to operate a radar image registration manager.

FIG. 6 illustrates, in a block diagram, one embodiment of composite graphing 600. The radar image registration manager 302 may take a DEM 610 to create a simulated image 620. The radar image registration manager 302 may use a normalized cross correlation to register the simulated image 620 and the actual primary sensor image 630. The radar image registration manager 302 may register the actual primary sensor image 630 to the DEM 610 for geopositioning to create a composite mapping correlation image 640. The registration may be used for ortho-rectifying and DEM draping the image, or for inverting for cross-sensor image registration.

Figure 7:
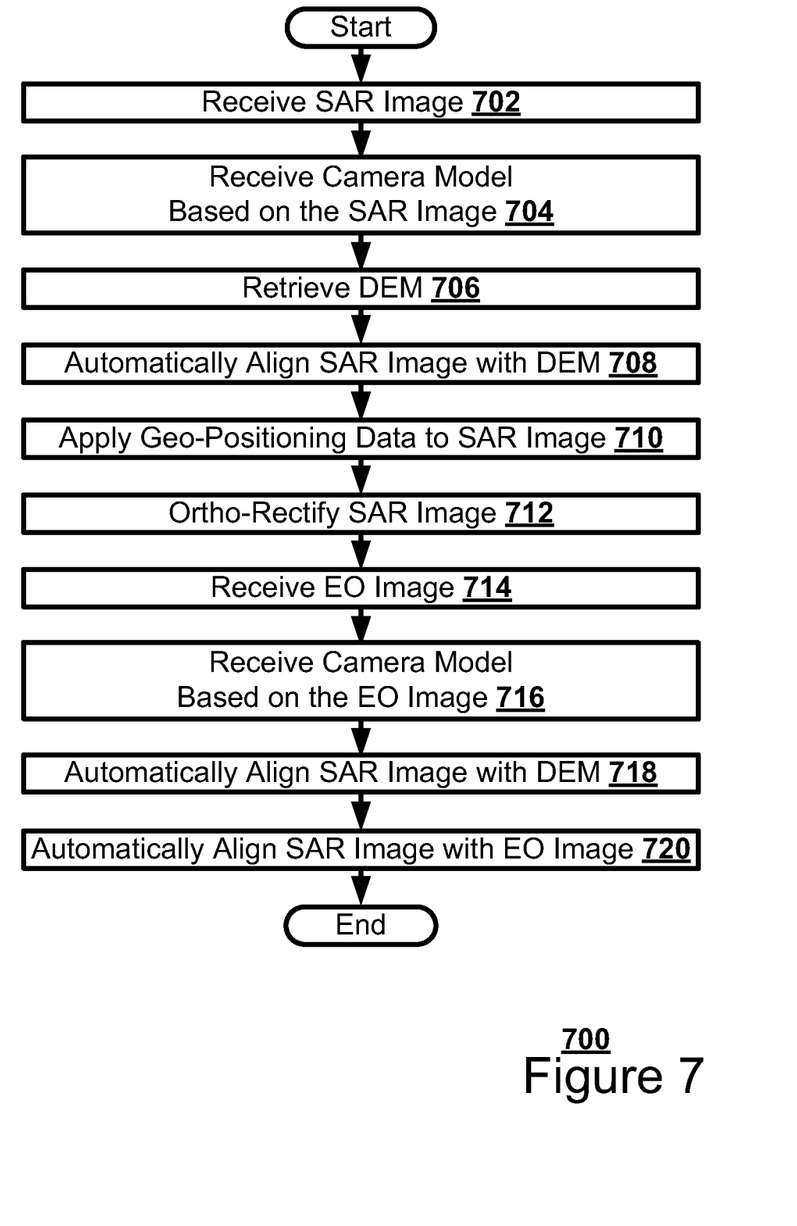
FIG. 7 illustrates, in a flowchart, one embodiment of a method for radar image registration.

FIG. 7 illustrates, in a flowchart, one embodiment of a method 700 for radar image registration. The radar image registration manager 302 may receive a primary sensor image, such as a SAR image (Block 702). The radar image registration manager 302 may receive primary image metadata, such as a primary camera model, based on the SAR image (Block 704). The radar image registration manager 302 may retrieve a DEM, either from a LIDAR or a previously stored DEM (Block 706). The radar image registration manager 302 may automatically align the SAR image with the DEM (Block 708). The radar image registration manager 302 may apply geo-positioning data to the SAR image (Block 710). The radar image registration manager 302 may ortho-rectify the SAR image (Block 712).

The radar image registration manager 302 may cross register different sensor images by using the DEM as a bridge. The radar image registration manager 302 may receive a registrant sensor image, such as an EO image (Block 714). The radar image registration manager 302 may receive registrant image metadata, such as a registrant camera model, based on the EO image (Block 716). The radar image registration manager 302 may automatically align the EO image with the DEM (Block 718). The radar image registration manager 302 may automatically align the SAR image with the EO image using the digital elevation model as a bridge (Block 720).

Figure 8:
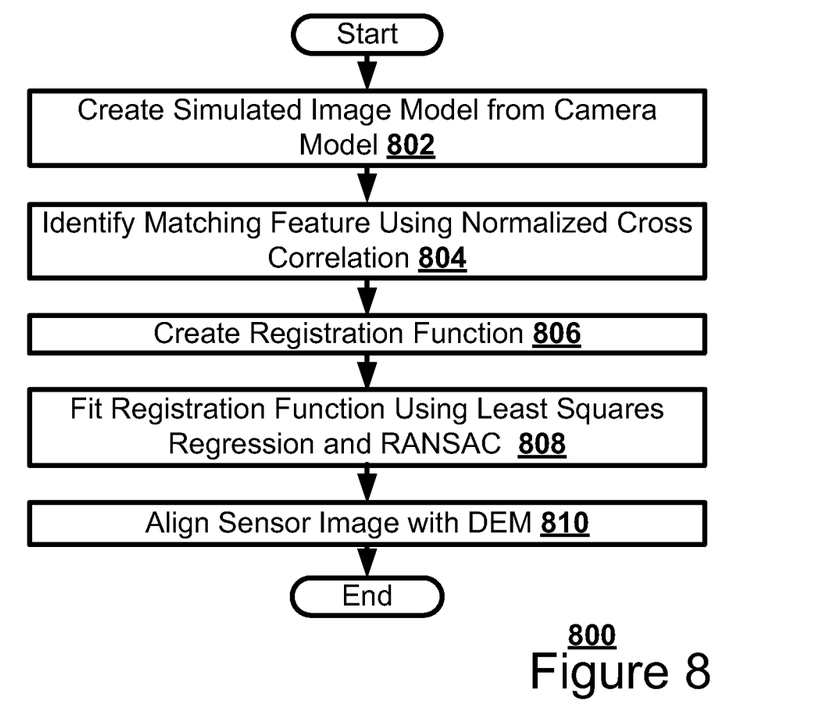
FIG. 8 illustrates, in a flowchart, one embodiment of a method for automatic image registration.

FIG. 8 illustrates, in a flowchart, one embodiment of a method 800 for automatic image registration. The radar image registration manager 302 may create a simulated image model of the digital elevation model using the camera model (Block 802). The radar image registration manager 302 may identify a matching feature between the simulated image model and the sensor image executing a normalized cross correlation (Block 804). The radar image registration manager 302 may create a registration function between the sensor image and the DEM (Block 806). The radar image registration manager 302 may fit the registration function to the matching feature executing at least one of a least squares regression and a random sample consensus (RANSAC) to fit the registration function (Block 808). The radar image registration manager 302 may align the sensor image with the DEM (Block 810).

Figure 9:
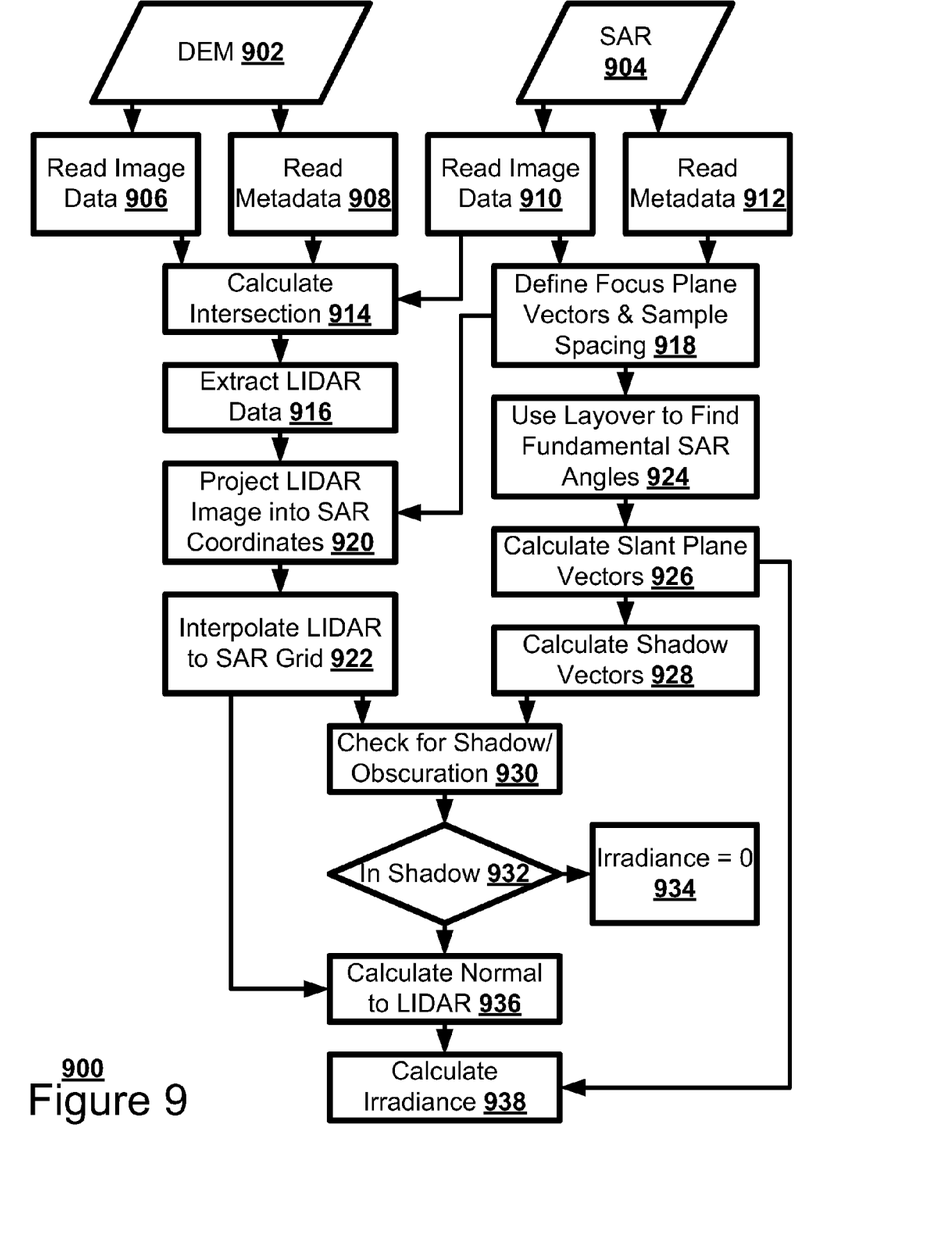
FIG. 9 illustrates, in a flow diagram, one embodiment of a method for registration.

FIG. 9 illustrates, in a flow diagram, one embodiment of a method 900 for registration. The radar image registration manager 302 may receive a DEM image 902 and a SAR image 904. The radar image registration manager 302 may read the image data (Block 906) and read the metadata (Block 908) from the DEM image 902. The radar image registration manager 302 may read the image data (Block 910) and read the metadata (Block 912) from the SAR image 902. The radar image registration manager 302 may calculate the intersection (Block 914) between the DEM image 902 and the SAR image 904 using the image data and metadata of the DEM image 902 and the metadata from the SAR image 904. The radar image registration manager 302 may extract the LIDAR data (Block 916) from the calculated intersection. The radar image registration manager 302 may define focus plane vectors and sample spacing (Block 918) based on the image data and metadata from the SAR image 902. The radar image registration manager 302 may project the LIDAR image 902 into SAR coordinates (Block 920) based on the LIDAR data, focus plane vectors, and sample spacing.

The radar image registration manager 302 may interpolate the LIDAR data to the SAR grid (Block 922). The radar image registration manager 302 may use layover to find fundamental SAR angles (Block 924), based on the focus plane vectors and the sample spacing. The radar image registration manager 302 may calculate slant plane vectors (Block 926) based on the fundamental SAR angles. The radar image registration manager 302 may calculate shadow vectors (Block 928) based on the shadow vectors. The radar image registration manager 302 may check for shadow and obscuration (Block 930) based on the LIDAR to SAR grid interpolation and the shadow vectors using radar shadow ray tracing.

If the radar image registration manager 302 determines that an image item is in shadow (Block 932), the radar image registration manager 302 may set an irradiance value as zero (Block 934). If the radar image registration manager 302 determines that an image item is not in shadow (Block 932), the radar image registration manager 302 calculates the vector normal to the LIDAR data (Block 936). The radar image registration manager 302 may calculate an irradiance value (Block 938). The radar image registration manager 302 may model the radar layover by accumulating irradiance values in image pixel bins.

Embodiments within the scope of the present invention may also include computer-readable media for carrying or having computer-executable instructions or data structures stored thereon. Such computer-readable media can be any tangible available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A computerized method to automatically align a primary sensor image with a digital elevation model (DEM), comprising:
   receiving at a processor a primary sensor image;
   retrieving using a processor a digital elevation model; and
   using a processor to automatically align the primary sensor image with the digital elevation model.

2. The computerized method of claim 1, wherein the primary sensor image is at least one of an electrical optical image and a synthetic aperture radar image.

3. The computerized method of claim 2, further comprising:
   receiving the digital elevation model (DEM) from a light detecting and ranging sensor.

4. The computerized method of claim 1, further comprising:
   receiving a camera model based on the primary sensor image.

5. The computerized method of claim 4, further comprising:
   creating a simulated image model of the digital elevation model using the camera model.

6. The computerized method of claim 5, further comprising:
   identifying a matching feature between the simulated image model and the primary sensor image.

7. The computerized method of claim 6, further comprising:
   executing a normalized cross correlation to identify the matching feature.

8. The computerized method of claim 6, further comprising:
   fitting a registration function to the matching feature.

9. The computerized method of claim 8, further comprising:
   executing at least one of a least squares regression and a random sample consensus to fit the registration function.

10. The computerized method of claim 1, further comprising:
    creating a registration function between the primary sensor image and the digital elevation model.

11. The computerized method of claim 1, further comprising:
    applying geo-positioning data to the primary sensor image.

12. The computerized method of claim 1, further comprising:
    orthorectifying the primary sensor image.

13. A radar image registration manager, comprising:
    a primary sensor interface that receives a synthetic aperture radar image and a camera model of the synthetic aperture radar image;
    a data storage that stores a digital elevation model; and
    a processor to automatically align the synthetic aperture radar image with the digital elevation model and to create a simulated image model of the digital elevation model using the camera model.

14. The radar image registration manager of claim 13, further comprising:
    a registrant sensor interface that receives a registrant sensor image to be automatically aligned with the synthetic aperture radar image.

15. The radar image registration manager of claim 13, wherein the digital elevation model (DEM) is received from a light detecting and ranging sensor and wherein the processor identifies a matching feature between the simulated image model and the synthetic aperture radar image.

16. The radar image registration manager of claim 13, wherein the processor identifies a matching feature between the simulated image model and the synthetic aperture radar image.

17. The radar image registration manager of claim 16, wherein the processor fits a registration function to the matching feature.

18. A tangible machine-readable medium having a set of instructions detailing a method stored thereon that when executed by one or more processors cause the one or more processors to perform the method, the method comprising:
  receiving a synthetic aperture radar image;
  receiving an electrical optical image;
  creating a simulated image model of a digital elevation model using a camera model of the synthetic aperture radar image, wherein the digital elevation model (DEM) is received from a light detecting and ranging sensor; and
  aligning automatically the synthetic aperture radar image with the electrical optical image using the digital elevation model.

19. The tangible machine-readable medium of claim 18, further comprising:
  applying geo-positioning data to the primary sensor image;
  applying cross correlation to identify matching features between the simulated image model and the primary sensor image;
  fitting a registration function to the identified matching features;
  wherein fitting the registration function uses at least one of least squares regression and random sample consensus.

20. The tangible machine-readable medium of claim 18, further comprising:
  aligning automatically the synthetic aperture radar image with the digital elevation model; and
  aligning automatically the digital elevation model with the electrical optical image.

* * * * *